(12) United States Patent
Myrbakken et al.

(10) Patent No.: US 12,709,477 B2
(45) Date of Patent: Aug. 18, 2026

(54) ACCESS STATION FOR AN AUTOMATED STORAGE AND RETRIEVAL SYSTEM

(71) Applicant: Autostore Technology AS, Nedre Vats (NO)

(72) Inventors: Joakim Aleksander Myrbakken, Skudeneshavn (NO); Øystein Gjerdevik, Skjold (NO)

(73) Assignee: AutoStore Technology AS, Nedre Vats (NO)

( * ) Notice: Subject to any disclaimer, the term of this patent is extended or adjusted under 35 U.S.C. 154(b) by 334 days.

(21) Appl. No.: 18/574,274

(22) PCT Filed: Jun. 24, 2022

(86) PCT No.: PCT/EP2022/067309

§ 371 (c)(1),
(2) Date: Dec. 26, 2023

(87) PCT Pub. No.: WO2023/274863

PCT Pub. Date: Jan. 5, 2023

(65) Prior Publication Data

US 2024/0336435 A1 Oct. 10, 2024

(30) Foreign Application Priority Data

Jun. 30, 2021 (NO) .................................... 20210850

(51) Int. Cl.
*B65G 1/04* (2006.01)
*B65G 1/137* (2006.01)

(52) U.S. Cl.
CPC ........... *B65G 1/137* (2013.01); *B65G 1/0464* (2013.01); *B65G 2207/40* (2013.01)

(58) Field of Classification Search
CPC .. B65G 1/137; B65G 1/0464; B65G 2207/40; B65G 1/1378; B65G 1/0485
See application file for complete search history.

(56) References Cited

U.S. PATENT DOCUMENTS

2025/0361084 A1* 11/2025 Myrbakken .......... B65G 1/0485

FOREIGN PATENT DOCUMENTS

CN 108137231 A 6/2018
DE 4342083 A1 6/1995
(Continued)

OTHER PUBLICATIONS

International Search Report issued in PCT/EP2022/067309 on Oct. 13, 2022 (4 pages).

(Continued)

*Primary Examiner* — Justin Holmes
(74) *Attorney, Agent, or Firm* — Baker Botts L.L.P.

(57) ABSTRACT

An access station for an automated storage and retrieval system includes a frame structure; a drawer arranged in the frame structure and including a compartment for accommodating a goods holder; and a blocker operational with the drawer for providing a safety zone above the receiving position. The drawer is movable between a receiving position for receiving the goods holder from above where the drawer is retracted into the frame structure for preventing a user from accessing the compartment, and a picking position for presenting the goods holder to a user. The blocker is configured to block movement of the drawer located in the receiving position when an object is located in the safety zone. The blocker is configured to block movement of the object into the safety zone when the drawer is at least partly located outside the receiving position.

19 Claims, 12 Drawing Sheets

(56) References Cited

FOREIGN PATENT DOCUMENTS

| | | | | | |
|---|---|---|---|---|---|
| DE | 102013012763 | A1 | | 2/2014 | |
| NO | 317366 | B1 | | 10/2004 | |
| WO | 2014/075937 | A1 | | 5/2014 | |
| WO | 2014/090684 | A1 | | 6/2014 | |
| WO | 2015/193278 | A1 | | 12/2015 | |
| WO | 2017/211596 | A1 | | 12/2017 | |
| WO | WO-2018069282 | A1 | * | 4/2018 | ........... B65G 1/1378 |
| WO | 2018/146304 | A1 | | 8/2018 | |
| WO | 2019/206487 | A1 | | 10/2019 | |
| WO | 2019/206971 | A1 | | 10/2019 | |
| WO | 2019/232651 | A1 | | 12/2019 | |
| WO | 2020/094604 | A1 | | 5/2020 | |
| WO | WO-2022180025 | A1 | * | 9/2022 | ............... B65G 1/04 |
| WO | WO-2022248470 | A1 | * | 12/2022 | ........... B65G 1/0464 |

OTHER PUBLICATIONS

Written Opinion of the International Searching Authority issued in PCT/EP2022/067309 on Oct. 13, 2022 (9 pages).

Norwegian Search Report issued in No. 20210850 mailed on Jan. 18, 2022 (2 pages).

Schneider, Marc, Extended European Search Report in EPO application 25201354.5, mailed Oct. 16, 2025, 8 pages, pub. by European Patent Office, Munich, Germany.

Guo, Yanze, Office Action in CN202280046456.4, mailed Mar. 15, 2026, 10 pages, The State Intellectual Property Office of the People's Republic of China, Beijing, China.

* cited by examiner

Z
Y
511
106
530
PR

Zs
520
106
530
533

600
119
304
PP
500
106
510
530

ACCESS STATION FOR AN AUTOMATED STORAGE AND RETRIEVAL SYSTEM

FIELD OF THE INVENTION

The present invention relates to an automated storage and retrieval system for storage and retrieval of containers, in particular to an access station for presentation of a storage container from an automated storage and retrieval system to a user.

BACKGROUND AND PRIOR ART

FIG. 1 discloses a prior art automated storage and retrieval system 1 with a framework structure 100 and FIGS. 2, 3 and 4 disclose three different prior art container handling vehicles 201, 301, 401 suitable for operating on such a system 1.

The framework structure 100 comprises upright members 102 and a storage volume comprising storage columns 105 arranged in rows between the upright members 102. In these storage columns 105 storage containers 106, also known as bins, are stacked one on top of one another to form stacks 107. The members 102 may typically be made of metal, e.g. extruded aluminum profiles.

The framework structure 100 of the automated storage and retrieval system 1 comprises a rail system 108 arranged across the top of framework structure 100, on which rail system 108 a plurality of container handling vehicles 201, 301, 401 may be operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201, 301, 401 in a first direction X across the top of the frame structure 100, and a second set of parallel rails 111 arranged perpendicular to the first set of rails 110 to guide movement of the container handling vehicles 201, 301, 401 in a second direction Y which is perpendicular to the first direction X. Containers 106 stored in the columns 105 are accessed by the container handling vehicles 201, 301, 401 through access openings 112 in the rail system 108. The container handling vehicles 201, 301, 401 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supporting.

Each prior art container handling vehicle 201, 301, 401 comprises a vehicle body 201*a*, 301*a*, 401*a* and first and second sets of wheels 201*b*, 201*c*, 301*b*, 301*c*, 401*b*, 401*c* which enable the lateral movement of the container handling vehicles 201, 301, 401 in the X direction and in the Y direction, respectively. In FIGS. 2, 3 and 4 two wheels in each set are fully visible. The first set of wheels 201*b*, 301*b*, 401*b* is arranged to engage with two adjacent rails of the first set 110 of rails, and the second set of wheels 201*c*, 301*c*, 401*c* is arranged to engage with two adjacent rails of the second set 111 of rails. At least one of the sets of wheels 201*b*, 201*c*, 301*b*, 301*c*, 401*b*, 401*c* can be lifted and lowered, so that the first set of wheels 201*b*, 301*b*, 401*b* and/or the second set of wheels 201*c*, 301*c*, 401*c* can be engaged with the respective set of rails 110, 111 at any one time.

Each prior art container handling vehicle 201, 301, 401 also comprises a lifting device for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 201, 301, 401 so that the position of the gripping/engaging devices with respect to the vehicle 201, 301, 401 can be adjusted in a third direction Z which is orthogonal the first direction X and the second direction Y. Parts of the gripping device of the container handling vehicles 301, 401 are shown in FIGS. 3 and 4 indicated with reference number 304, 404. The gripping device of the container handling device 201 is located within the vehicle body 201*a* in FIG. 2 and is thus not visible in the figure.

Conventionally, and also for the purpose of this application, Z=1 identifies the uppermost layer available for storage containers below the rails 110, 111, i.e. the layer immediately below the rail system 108, Z=2 the second layer below the rail system 108, Z=3 the third layer etc. In the exemplary prior art disclosed in FIG. 1, Z=7 identifies the lowermost, bottom layer of storage containers. Similarly, X=1 . . . n and Y=1 . . . n identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position X=17, Y=1, Z=5. The container handling vehicles 201, 301, 401 can be said to travel in layer Z=0, and each storage column 105 can be identified by its X and Y coordinates. Thus, the storage containers shown in FIG. 1 extending above the rail system 108 are also said to be arranged in layer Z=0.

The storage volume of the framework structure 100 has often been referred to as a grid 104, where the possible storage positions within this grid are referred to as storage cells. Each storage column may be identified by a position in an X- and Y-direction, while each storage cell may be identified by a container number in the X-, Y- and Z-direction.

Each prior art container handling vehicle 201, 301, 401 comprises a storage compartment or space for receiving and stowing a storage container 106 when transporting the storage container 106 across the rail system 108. The storage space may comprise a cavity arranged internally within the vehicle body 201*a*, 401*a* as shown in FIGS. 2 and 4 and as described in e.g. WO2015/193278A1 and WO2019/206487A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The cavity container handling vehicles 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the cavity container handling vehicles 401 may have a footprint which is larger than the lateral area defined by a storage column 105 as shown in FIGS. 1 and 4, e.g. as is disclosed in WO2014/090684A1 or WO2019/206487A1.

The rail system 108 typically comprises rails with grooves in which the wheels of the vehicles run. Alternatively, the rails may comprise upwardly protruding elements, where the wheels of the vehicles comprise flanges to prevent derailing. These grooves and upwardly protruding elements are collectively known as tracks. Each rail may comprise one track, or each rail 110, 111 may comprise two parallel tracks. In other rail systems 108, each rail in one direction (e.g. an X direction) may comprise one track and each rail in the other perpendicular direction (e.g. a Y direction) may comprise two tracks. Each rail 110, 111 may also comprise two track members that are fastened together, each track member providing one of a pair of tracks provided by each rail.

WO2018/146304A1, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201, 301, 401 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119, 120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119, 120 for further transportation to an access station. The transportation from the port to the access station may require movement along various different directions, by means such as delivery vehicles, trolleys or other transportation lines. Note that the term 'tilted' means transportation of storage containers 106 having a general transportation orientation somewhere between horizontal and vertical.

In FIG. 1, the first port column 119 may for example be a dedicated drop-off port column where the container handling vehicles 201, 301, 401 can drop off storage containers 106 to be transported to an access or a transfer station, and the second port column 120 may be a dedicated pick-up port column where the container handling vehicles 201, 301, 401 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1, but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119, 120 and the access station.

If the port columns 119, 120 and the access station are located at different levels, the conveyor system may comprise a lift device with a vertical component for transporting the storage containers 106 vertically between the port column 119, 120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201, 301, 401 is instructed to retrieve the target storage container 106 from its position and transport it to the drop-off port column 119. This operation involves moving the container handling vehicle 201, 301, 401 to a location above the storage column 105 in which the target storage container 106 is positioned, retrieving the storage container 106 from the storage column 105 using the container handling vehicle's 201, 301, 401 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles. Alternatively, or in addition, the automated storage and retrieval system 1 may have container handling vehicles 201, 301, 401 specifically dedicated to the task of temporarily removing storage containers 106 from a storage column 105. Once the target storage container 106 has been removed from the storage column 105, the temporarily removed storage containers 106 can be repositioned into the original storage column 105. However, the removed storage containers 106 may alternatively be relocated to other storage columns 105.

When a storage container 106 is to be stored in one of the columns 105, one of the container handling vehicles 201, 301, 401 is instructed to pick up the storage container 106 from the pick-up port column 120 and transport it to a location above the storage column 105 where it is to be stored. After any storage containers 106 positioned at or above the target position within the stack 107 have been removed, the container handling vehicle 201, 301, 401 positions the storage container 106 at the desired position. The removed storage containers 106 may then be lowered back into the storage column 105, or relocated to other storage columns 105.

For monitoring and controlling the automated storage and retrieval system 1, e.g. monitoring and controlling the location of respective storage containers 106 within the framework structure 100, the content of each storage container 106; and the movement of the container handling vehicles 201, 301, 401 so that a desired storage container 106 can be delivered to the desired location at the desired time without the container handling vehicles 201, 301, 401 colliding with each other, the automated storage and retrieval system 1 comprises a control system 600 which typically is computerized and which typically comprises a database for keeping track of the storage containers 106.

In WO2017/211596 a storage system for storing product items is disclosed. The storage system comprises a grid structure and a number of storage bins configured to be stored in vertical compartments in the grid structure. Each storage bin is configured to contain at least one product item. The storage system comprises a picking and/or supply station where a product item is configured to be picked from one of the storage bins and/or where a product item is configured to be supplied to one of the storage bins. The picking and/or supply station comprises a drawer device, where the drawer device comprises a storage container with a compartment for temporarily storing a product item to be picked from or supplied to the storage system. The drawer device is configured to be in a closed state or in an open state; where a person is prevented from accessing the compartment in the closed state and where the person is allowed to access to the compartment in the open state.

It is an objective of the present invention to make an access station of the above-mentioned type safer to operate.

SUMMARY OF THE INVENTION

The present invention is set forth and characterized in the independent claims, while the dependent claims describe other characteristics of the invention.

The present invention relates to an access station for an automated storage and retrieval system, wherein the access station comprises:

- a frame structure;
- a drawer arranged in the frame structure and comprising a compartment for accommodating a goods holder,
- wherein the drawer is movable between a receiving position for receiving the goods holder from above where the drawer is retracted into the frame structure for preventing a user from accessing the compartment, and a picking position for presenting the goods holder to a user; and
- a blocker operational with the drawer for providing a safety zone above the receiving position,
- wherein the blocker is configured to block movement of the drawer located in the receiving position when an object is located in the safety zone, and
- wherein the blocker is configured to block movement of the object into the safety zone when the drawer is at least partly located outside the receiving position.

The blocker therefore prevents an object (e.g. a gripping device from a load handling device) from moving downwardly through the safety zone whilst a user (i.e. a picker or a consumer) can access the compartment and any goods holder contained therein.

The blocker can prevent objects (e.g. a goods holder such as a storage container) falling down the port column from injuring the hand of the user.

The blocker can prevent an unintentional operation of the gripping device from injuring the hand of the user.

It is thus provided a safety mechanism that can prevent a user from being injured, in particular a user who has not been trained in the use of the access station, such as a customer picking up an order. This access station is therefore particularly suited for use as a pickup point accessible to the public, for instance as a curbside pickup point, one which is placed at the exterior of a building/warehouse etc. . . .

The blocker may be directly or indirectly connected to the drawer, e.g. via an intermediate component. This connection may enable the movement of the blocker as the drawer is moved.

The goods holder may e.g. be a storage container, a bin, a tote, a pallet, a tray or similar.

The user will be located external to the frame structure.

The receiving position may preferably be arranged in an interior of the frame structure. The receiving position may typically have an upright orientation.

The drawer preferably has an open top.

In one aspect, the blocker may be configured to be located outside the safety zone when the drawer is located in the receiving position.

The blocker may be configured to be located between two upright members of the frame structure when the drawer is located in the receiving position.

In one aspect, the blocker may be configured to be located inside the safety zone when the drawer is located at least partly outside the receiving position.

In one aspect, the drawer may be arranged to slide between the receiving position and the picking position.

In one aspect, the drawer may be a conveyor extending from the receiving position to the picking position wherein the conveyor is arranged to convey a goods holder between the receiving position and the picking position.

In one aspect, the drawer may be a tilt drawer arranged to tilt between the receiving position and the picking position.

The receiving position of the tilt drawer may preferably have an upright orientation. However, the receiving position may have a tilted orientation if it is less tilted than the picking position.

In one aspect, the access station may comprise a tilt limiter configured to limit pivotal movement of the tilt drawer beyond the picking position.

The tilt limiter may be configured to cause engagement between the drawer device and the frame structure at a predetermined point of the pivotal movement, such that further pivotal movement is prevented. The predetermined point of the pivotal movement will typically be the picking position.

In one aspect, the tilt limiter may be arranged on the tilt drawer.

The predetermined position is preferably set such that the frame structure at least partly obstructs access to the compartment when the tilt drawer is in this position. By limiting the available access opening of the compartment to an area smaller than external dimensions of a goods holder, retrieval of a goods holder from the compartment is prevented.

This will prevent vandals from stealing goods holder from the system when the access station is used as a curbside pickup point.

Alternatively, a tilt limiter may be arranged at the bottom of the front end (i.e. the foot) of the drawer. The tilt limiter will then abut the base of the frame structure after a predetermined tilting.

Alternatively, a tilt limiter may be arranged on the frame structure.

The tilt drawer has a tilting angle $\alpha$ between the receiving position and the picking position.

The tilting angle $\alpha$ may range from 15° to 60° relative to a horizontal plane $P_H$, more preferably from 20° to 55°, even more preferably from 25° to 50°, even more preferably from 30° to 45°, even more preferably from 35° to 40°, for example 32.5°.

A preferred tilting angle range is 30° to 40°. Alternatively, this range may have a starting point of 10°, 15°, 20°, 25°, 30°, 35°. Alternatively, this range may have an end point of 35°, 40°, 45°, 50°, 55°, 60°.

The tilt limiter may be arranged on the tilt drawer and configured to extend upwardly relative to the tilt drawer. The tilt limiter may be a separate item connected to the tilt drawer or be made part of (i.e. integral with) the tilt drawer. The tilting angle may then be set by the length of the tilt limiter.

The tilt limiter is preferably configured to not obstruct the alignment of the compartment of the tilt drawer with a column of the frame structure when the tilt drawer is located in the receiving position.

In one aspect, the tilt drawer may have a horizontal axis of rotation arranged under the middle of the tilt drawer. More preferred, the axis of rotation may be arranged at a lower end of the tilt drawer.

The tilt drawer's axis of rotation is preferably arranged above the base of the frame structure.

It is thus achieved a tilt drawer wherein the part of the tilt drawer above the middle (i.e. an upper part) has a longer movement than the part of the tilt drawer below the middle (i.e. a lower part) when the tilt drawer is tilted. The upper part of the tilt drawer may then move at least partly outside the frame structure while the lower part of the tilt drawer stays inside the frame structure, also when the base of the tilt drawer and the base of the frame structure substantially has the same size.

In one aspect, the tilt drawer may have a horizontal axis of rotation arranged in a horizontal central part of the tilt drawer and/or the frame structure.

By having a horizontal axis of rotation arranged in a horizontal central part (i.e. a part with a horizontal distance to the vertical side surfaces) of the tilt drawer and/or the frame structure, the vertical gap between the frame structure and the tilt drawer can be kept at a minimum when the drawer is in the receiving position.

In one aspect, the safety zone may have a safety height that extends upwardly from the drawer at least 0.5 meters, preferably at least 0.75 meters, more preferably at least 1.0 meters.

The safety height preferably exceeds an arm's length. If a user for some reason should put their arm inside the access station, injuries can still be prevented.

In one aspect, the access station may be configured for vertical alignment of the receiving position with a port column of an automated storage and retrieval system such that a goods holder can be introduced from the port column to the compartment whilst the drawer is in the receiving position, and wherein the blocker prevents introduction of a goods holder into the compartment from the port column whilst the drawer is not in the receiving position.

In one aspect, the blocker may be attached to the drawer as a retrofitted part.

This will allow improvement of existing access stations. Furthermore, access stations previously used inside a warehouse (within users are trained pickers) can in this way be converted to access stations suitable for use as a curbside pickup point (wherein user are not trained).

A curbside pickup point may be located on a pavement area, in a foyer of a public building or on a public square, ideally positioned without interfering with the pedestrians. The curbside pickup point may also be part of a commercial building (e.g. a grocery or other store). The curbside pickup point may also be positioned on a commercial site (e.g. at a garden nursery dispensing plants, etc.).

In one aspect, the drawer may be biased towards the receiving position.

This will allow continued operation of the access station in cases when the user forgets to close the drawer after picking. This is particularly relevant when the user is not trained in using the access station and typically only has one picking to perform.

The biasing means may be a spring, a damper, a clump weight situated as appropriate in the drawer or any combinations thereof. The biasing means may be arranged in a lower part of the drawer.

In one aspect, the frame structure and/or the drawer may be configured to prevent retrieval of a goods holder from the compartment when the drawer is in the picking position.

This will prevent vandals from stealing goods holders from the system when the access station is used as a curbside pickup point.

The access station may comprise a limiter configured to cause engagement between the drawer and the frame structure at a predetermined point of the movement, such that further movement of the drawer is prevented. The predetermined point of the movement will typically be the picking position. The limiter may be arranged on the drawer and/or the frame structure.

The predetermined position is preferably set such that the frame structure at least partly obstructs access to the compartment when the drawer is in this position. By limiting the available access opening of the compartment to an area smaller than any dimension of the goods holder, retrieval of a goods holder from the compartment is prevented.

In one aspect, the blocker may be arranged on the drawer and configured to extend upward in a vertical direction above the drawer.

If the drawer is movable in a sliding manner, the vertical extent of the blocker will stay the same regardless of the position of the drawer.

If the drawer is movable in a pivoting manner, the blocker should have a vertical extent whenever it is outside or at least partly outside the receiving position.

The blocker may be a separate item connected to the drawer or be made as one with a part of the drawer.

The blocker should be rigid enough to withstand any expected loads, such as the weight of a gripping device or a goods holder including its content.

The safety height may be set by the length of the blocker.

In one aspect, the blocker is arranged on the frame structure and connected to the drawer by means of a connecting device, wherein movement of the drawer out of the receiving position causes the blocker to be deployed into and block off entry into the safety zone.

The blocker, attached to the frame structure (520), may move in a sliding or pivoting manner.

The connecting device may be one piece, e.g. an elongated flexible transfer element. Alternatively, the connecting device may be an assembly comprising an elongated flexible transfer element, a pulley, any type of gear, or combinations thereof.

The connecting device may be connected to the blocker in a sliding manner, e.g. by means of a groove in the blocker.

In one aspect, the blocker may comprise biasing means for biasing the blocker out of the safety zone to allow an object to enter the safety zone.

The biasing means may be a spring, a damper, a clump weight or any combinations thereof. Alternatively, the blocker may be arranged such that it is urged out of the safety zone by means of its own weight, e.g. by being hinged to the frame structure with a horizontal axis of rotation.

In one aspect, the access station may comprise a sensor for sensing the presence of an object in the safety zone, an electric motor for operating the blocker between a position outside the safety zone and a position inside the safety zone, an electric lock for locking the drawer in the receiving position, and a control system for communicating with the sensor, the electric motor and the electric lock.

Wherein the control system may be configured to lock the drawer in the receiving position when the blocker is positioned outside the safety zone and to unlock the drawer when the blocker is positioned inside the safety zone.

Wherein the control system may be configured to retain the blocker in a position inside the safety zone when the drawer is located at least partly outside the receiving position.

Wherein the control system may be configured to retain the blocker in a position outside the safety zone when the sensor detects an object in the safety zone.

Wherein the sensor may be configured to distinguish the blocker from other objects.

The present invention also relates to an automated storage and retrieval system, wherein the automated storage and retrieval system comprises:

- an access station as described herein;
- a rail system comprising a first set of parallel rails arranged in a horizontal plane and extending in a first direction and a second set of parallel rails arranged in the horizontal plane and extending in a second direction which is orthogonal to the first direction, which first and second sets of rails form a grid in the horizontal plane comprising a plurality of adjacent access openings;
- a storage section comprising a plurality of goods holders arranged in storage columns located beneath the rail system,
- wherein each storage column is located vertically below one of the plurality of access openings;
- at least one port column located beneath the rail system and vertically aligned with a receiving position of the access station, the at least one port column being void of goods holders; and
- a container handling vehicle comprising a gripping device for lifting goods holders stored in the columns above the storage section and drive means configured to drive the vehicle along the rail system in at least one of the first direction and the second direction.

In one aspect, the automated storage and retrieval system may comprise at least two access stations, preferably three or four access stations.

The plurality of access stations may preferably be arranged side by side on a pavement area, in a foyer of a public building or on a public square, ideally positioned without interfering with the pedestrians. The access station may also be part of a commercial building (e.g. a grocery or other store). The access station may also be positioned on a commercial site (e.g. at a garden nursery dispensing plants, etc.). The access station may also be part of a large vending machine. The access station may be part of a bag storage.

In one aspect, the method comprises the steps of:

- retrieving a goods holder stored in a storage section of a storage and retrieval system by means of a container handling vehicle comprising a gripping device;
- entering a safety zone with the goods holder being held by the gripping device, wherein a drawer of the access station has been moved to a receiving position, the receiving position being arranged below the safety zone;
- placing the goods holder in a compartment of the drawer;
- retracting the gripping device to a position outside the safety zone; and
- moving the drawer into a picking position to present the goods holder to the user.

The user can then pick one or several product items from the goods holder with reduced risk of getting injured.

Furthermore, there is no risk of the user opening the drawer while the gripping device is inside the safety zone to deliver the goods holder.

In one aspect, the method, after presenting the goods holder to the user, may further comprise the steps of:

- returning the drawer to the receiving position;
- entering the safety zone with the gripping device; and
- retracting the goods holder from the compartment by means of the gripping device to a position outside the safety zone.

BRIEF DESCRIPTION OF THE DRAWINGS

Following drawings are appended to facilitate the understanding of the invention. The drawings show embodiments of the invention, which will now be described by way of example only, where.

DETAILED DESCRIPTION OF THE INVENTION

Figure 1:
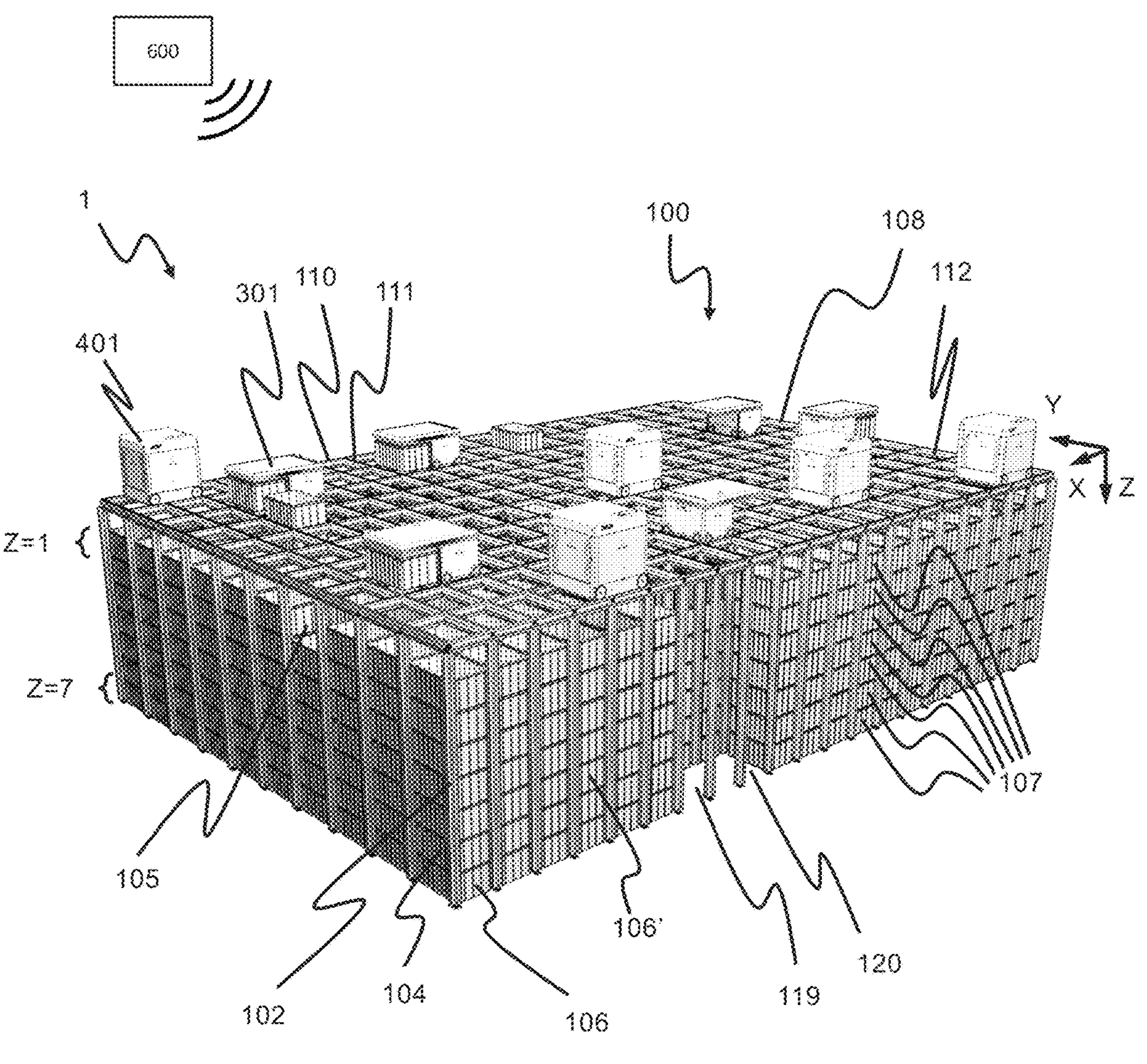
FIG. 1 is a perspective view of a framework structure of a prior art automated storage and retrieval system.

In the following, embodiments of the invention will be discussed in more detail with reference to the appended drawings. It should be understood, however, that the drawings are not intended to limit the invention to the subject-matter depicted in the drawings.

Figure 2:
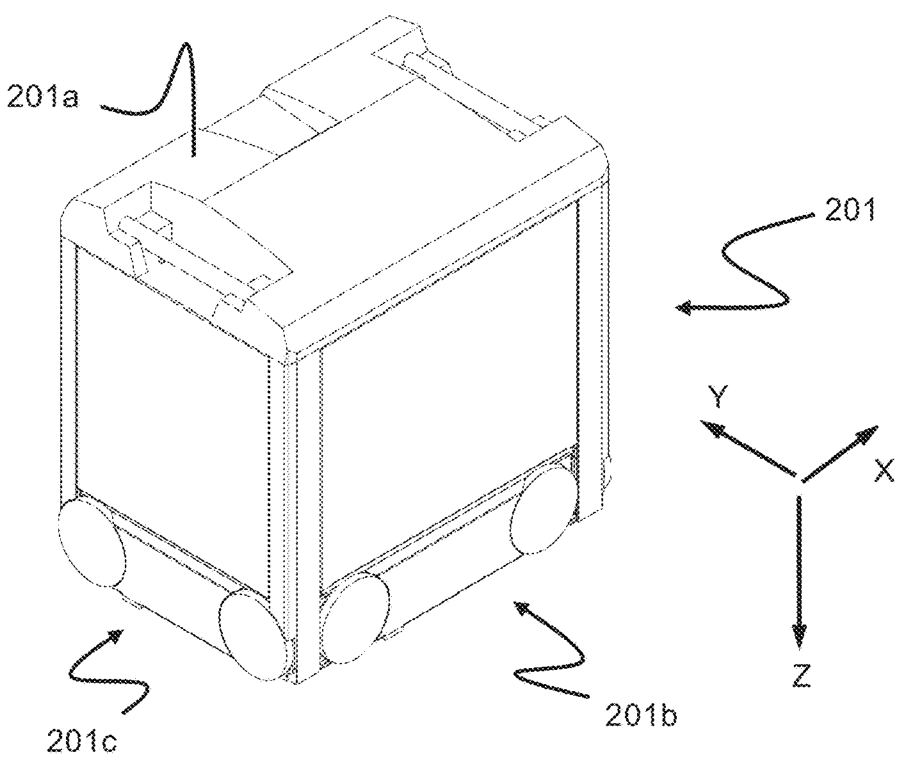
FIG. 2 is a perspective view of a prior art container handling vehicle having an internally arranged cavity for carrying storage containers therein.
Figure 3:
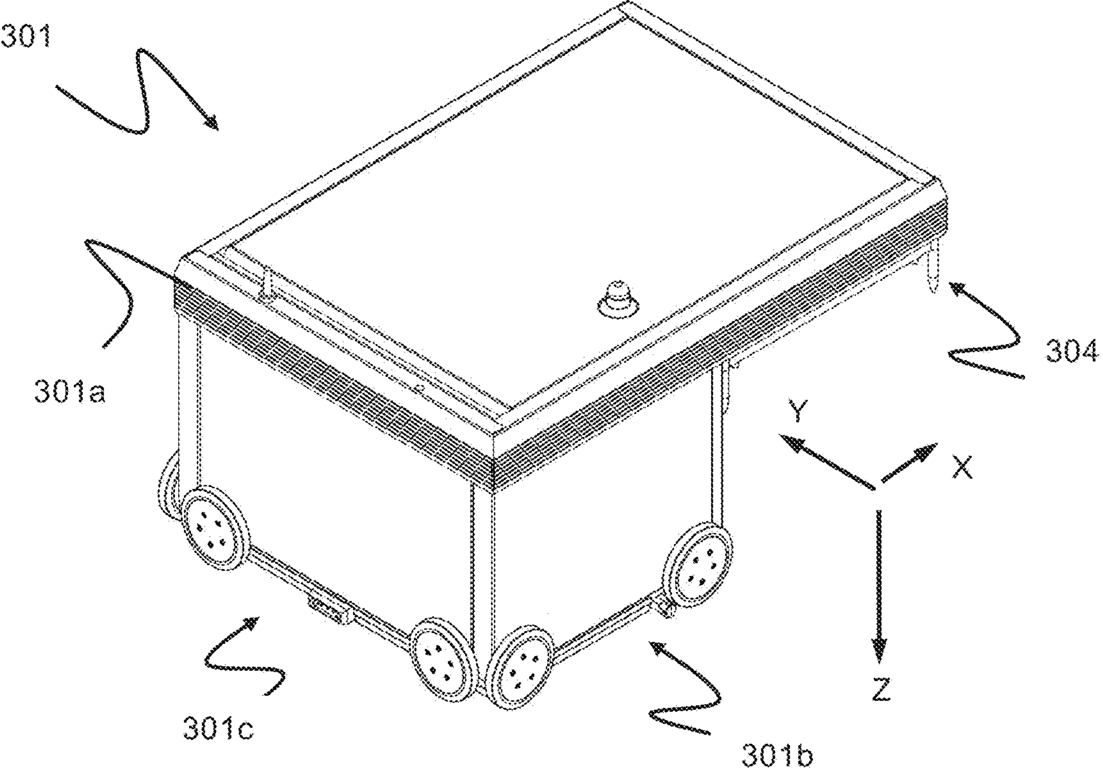
FIG. 3 is a perspective view of a prior art container handling vehicle having a cantilever for carrying storage containers underneath.

The framework structure 100 of the automated storage and retrieval system 1 is constructed in a similar manner to the prior art framework structure 100 described above in connection with FIGS. 1-3. That is, the framework structure 100 comprises a number of upright members 102, and further comprises a first, upper rail system 108 extending in the X direction and Y direction.

The framework structure 100 further comprises storage compartments in the form of storage columns 105 provided between the members 102, 103, where storage containers 106 are stackable in stacks 107 within the storage columns 105.

The framework structure 100 can be of any size. In particular it is understood that the framework structure can be considerably wider and/or longer and/or deeper than disclosed in FIG. 1. For example, the framework structure 100 may have a horizontal extent of more than 700×700 columns and a storage depth of more than twelve containers.

One embodiment of the automated storage and retrieval system according to the invention will now be discussed in more detail with reference to Figs.

Figure 4:
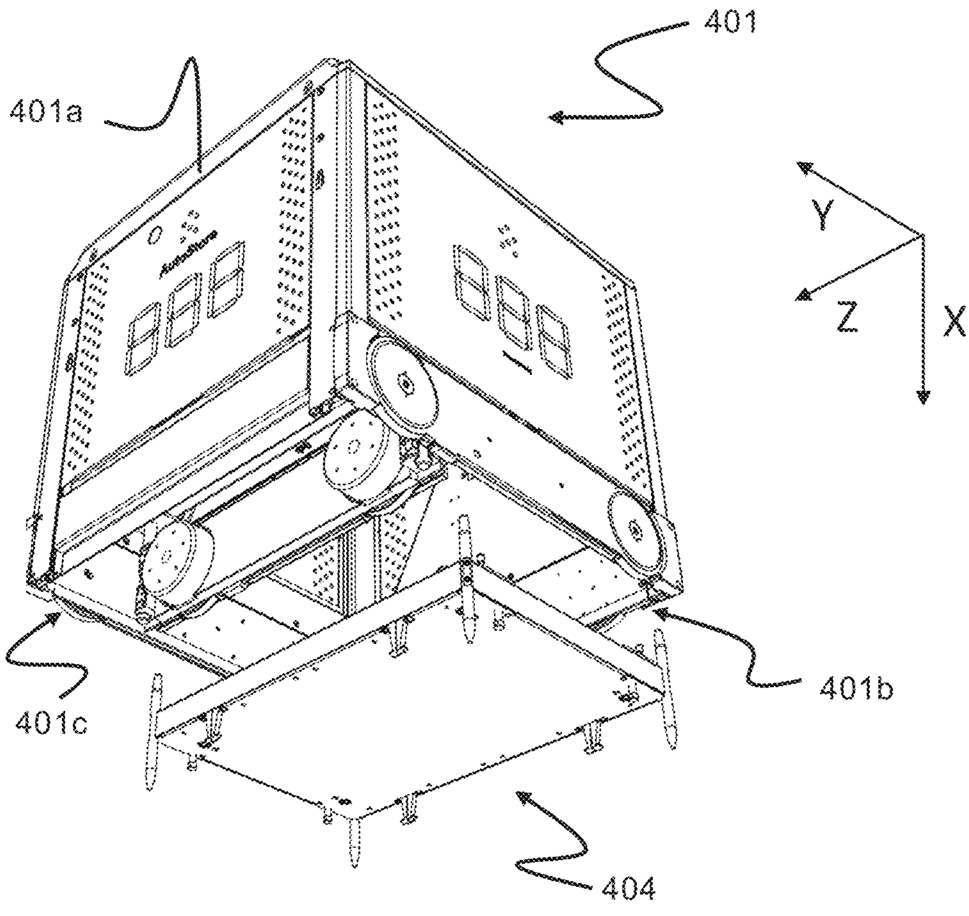
FIG. 4 is a perspective view of a prior art container handling vehicle having an internally arranged cavity for carrying storage containers therein.
Figure 5:
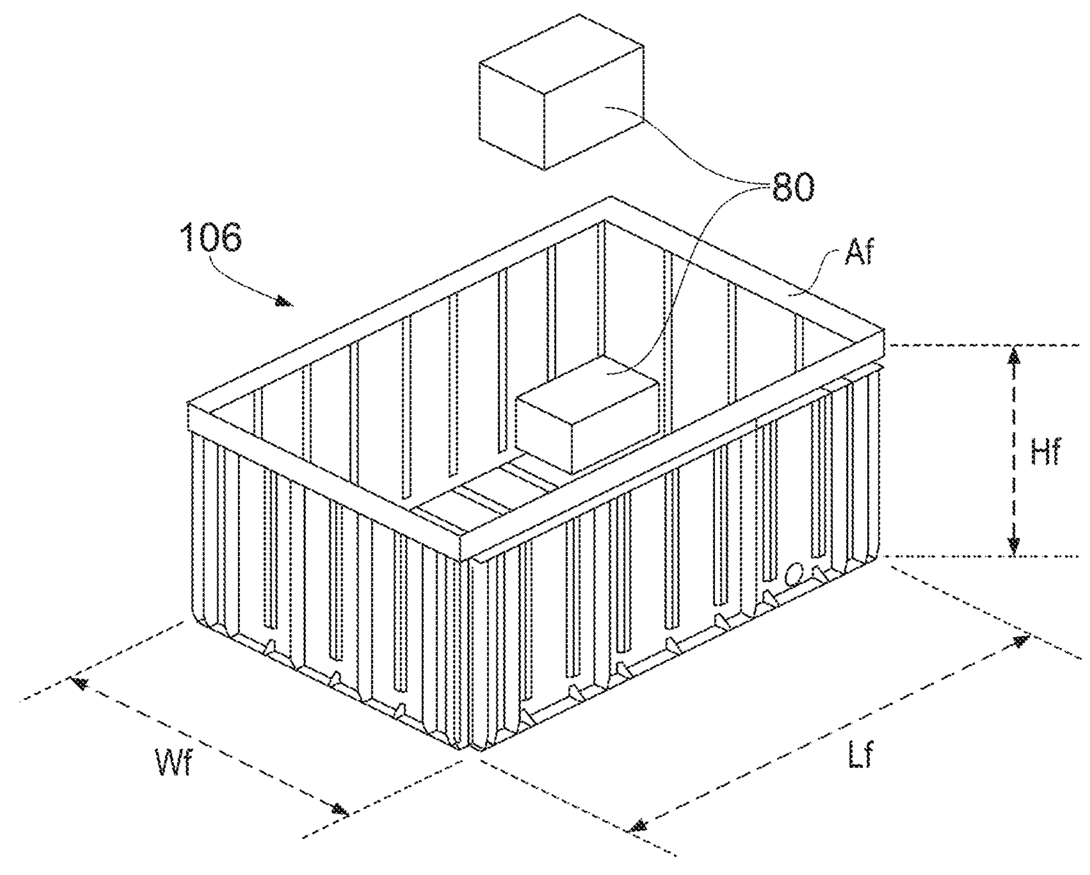
FIG. 5 is a perspective view of a storage container and product items stored in the storage container.

FIG. 5 shows examples of product items 80 stored in a storage container 106. The storage container 106 illustrated in FIG. 4 has a height Hf, a width Wf and a length Lf. The storage container 106 has a horizontal cross section Af.

Figure 6A:
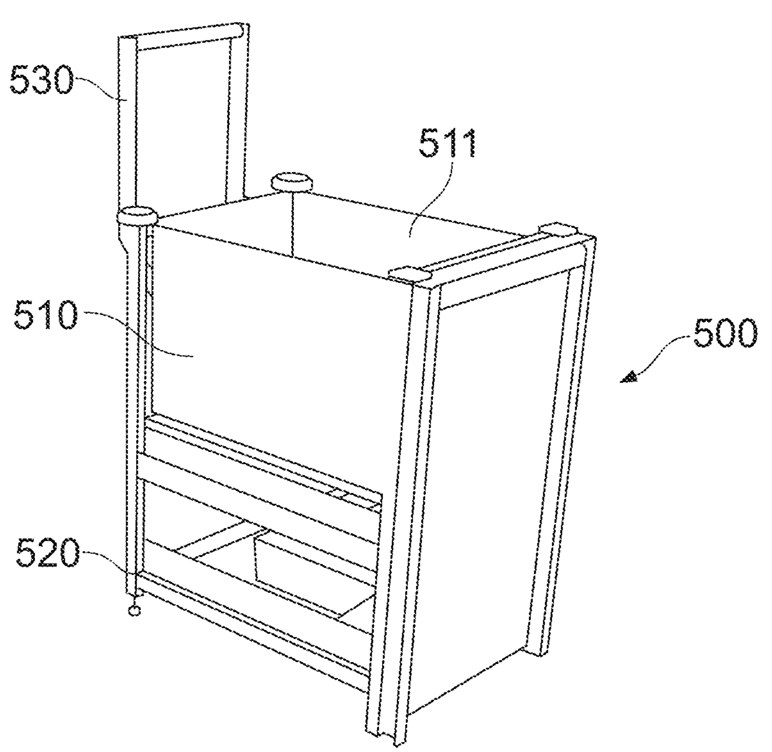
FIG. 6*a* is a perspective view of an access station comprising a drawer, a frame structure, and a blocker wherein the drawer comprises a compartment for a goods holder and is located in a receiving position.

FIG. 6*a* shows a perspective view of an access station 500 suitable for an automated storage and retrieval system. The access station 500 comprises a frame structure 520, and a drawer 510 arranged in the frame structure 520. The drawer 510 comprises a compartment 511 suitable for accommodating a goods holder.

In FIG. 6*a*, the drawer 510 is retracted in the frame structure 520. This position of the drawer 510 may be referred to as a receiving position $P_R$ as it allows a goods holder (such as a storage container 106, a bin, a tote, a pallet, a tray or similar) to be received in the compartment 511, typically from above. The access station 500 is preferably configured to prevent a user from accessing the compartment 511 when the drawer 510 is in the receiving position $P_R$.

Figure 6B:
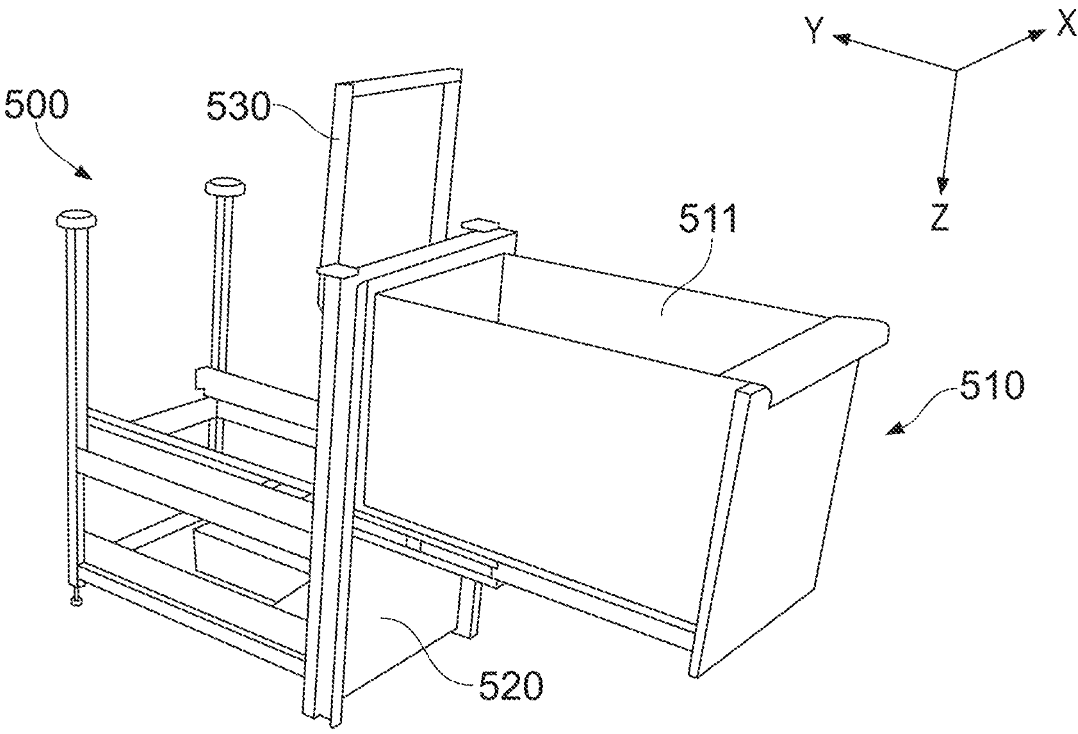
FIG. 6*b* is a perspective view of the access station of FIG. 6*a* wherein the drawer is located in a picking position.

FIG. 6*b* is a perspective view of the access station of FIG. 6*a*. In FIG. 6*b*, the drawer 510 is pulled out from the frame structure 520. In this position the drawer 510 presents the compartment 511 (and thus also a goods holder positioned in the compartment 511) to an exterior of the frame structure 520. This position may be referred to as a picking position $P_P$ as it allows a user of the access station 500 to access the compartment 511 and thus pick items 80 from a goods holder located in the compartment 511.

The drawer 510 is movable between the receiving position $P_R$ and the picking position $P_P$. The drawer 510 may be moved between the receiving position $P_R$ and the picking position $P_P$ in any suitable manner. The example of FIG. 6*a* and FIG. 6*b* shows that the drawer 510 may be moved between the receiving position $P_R$ and the picking position $P_P$ in a sliding manner. The movement may then preferably follow a horizontal path. FIG. 9*a* to FIG. 11*b* shows an alternative movement of the drawer 510.

The access station 500 further comprises a blocker 530. The blocker 530 is operational with the drawer 510, such that movement of the drawer 510 cause the blocker 530 to move.

Figure 12C:
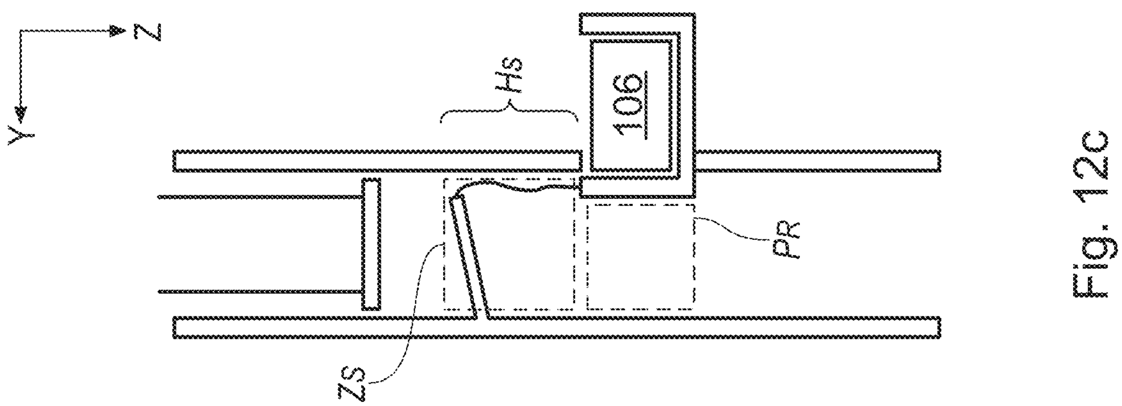
FIG. 12*c* is a horizontal cross-section of the access station of FIG. 12*a* wherein the drawer is located in the picking position, the gripping device is located above the safety zone, and the blocker prevents movement of the gripping device into the safety zone.
Figure 12B:
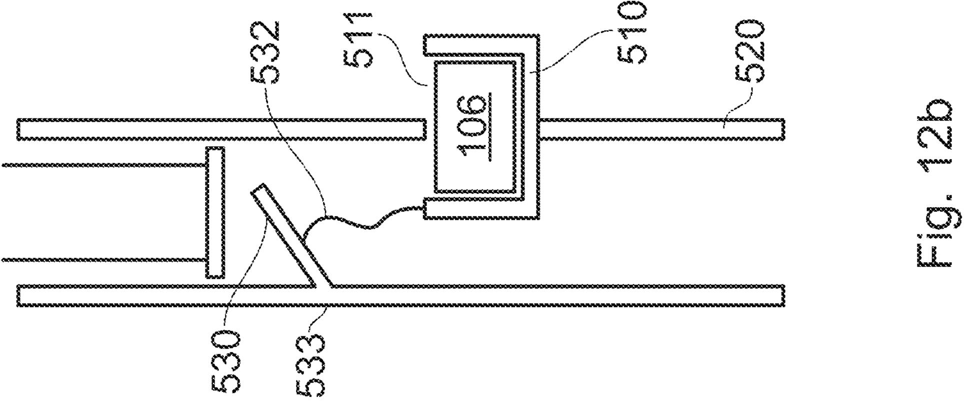
FIG. 12*b* is a horizontal cross-section of the access station of FIG. 12*a* wherein the drawer is located partly outside the receiving position, the gripping device is located above the safety zone, and the blocker prevents movement of the gripping device into the safety zone.
Figure 12A:
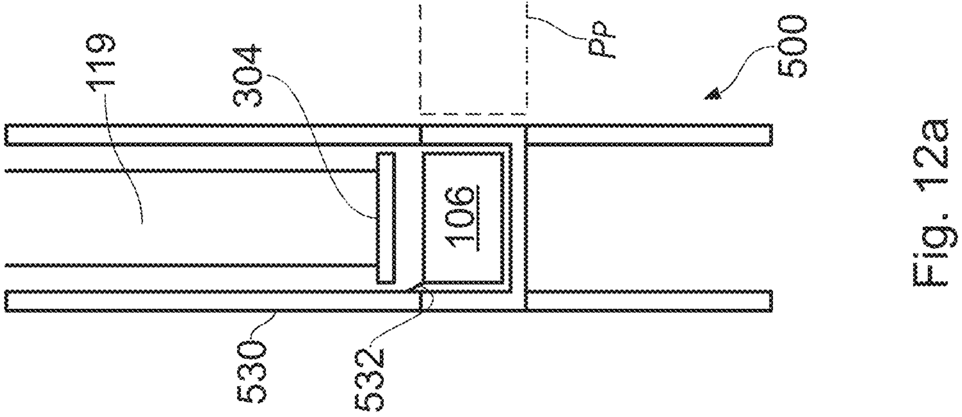
FIG. 12*a* is a horizontal cross-section of an access station wherein a goods holder is positioned in the compartment of the drawer by means of a gripping device, the drawer is located in the receiving position, the gripping device is located inside a safety zone of the access station, and the blocker is connected to the drawer by means of a connecting device and prevents movement of the drawer.

The blocker 530 may be part of the drawer 510 or a separate item attached to the drawer 510. The blocker 530 may also be retrofitted if the access station 500 did not originally comprise this feature. Alternatively, the blocker 530 may be indirectly connected to the drawer 510 via an intermediate component, e.g. a connecting device 532 as illustrated in FIG. 12*a-c*.

The drawer 510 has a rear end and a front end. The rear end of the drawer 510 is typically facing a storage side of the access station 500 when connected to an automated storage and retrieval system, whereas the front end is typically facing a picking side of the access station 500. The picking side being accessible to users of the access station 500.

The blocker 530 may preferably be arranged at a rear end of the drawer 510.

The blocker 530 may be configured to extend upward in a vertical direction Z above the drawer 510.

Figure 7:
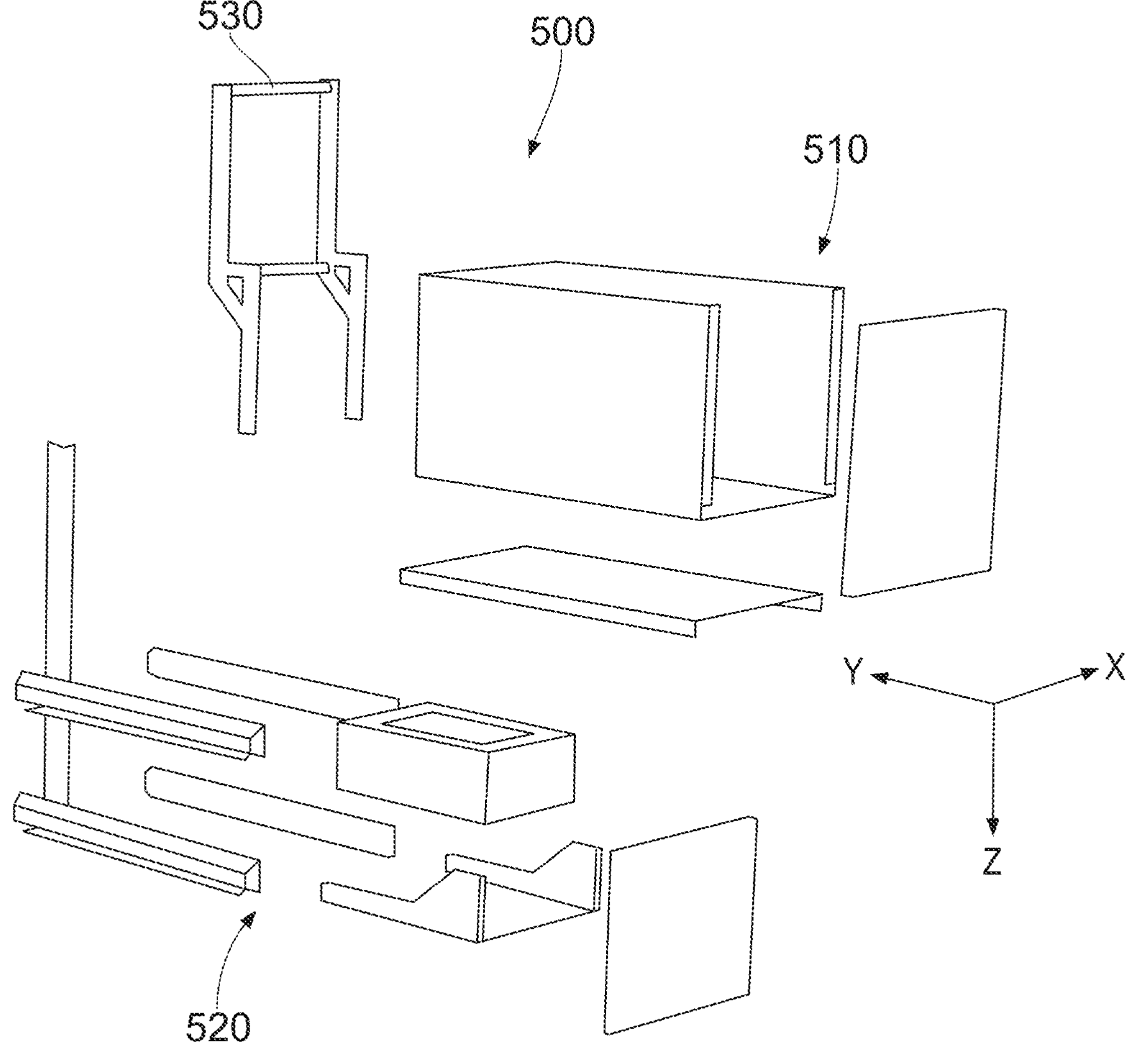
FIG. 7 is an exploded view of the access station of FIG. 6*a;*

FIG. 7 shows an exploded view of the access station of FIG. 6*a* and FIG. 6*b*.

The frame structure 520 may be an assembly of several components (such as beams, brackets, plates and/or rails) providing support to the drawer 510. The frame structure 520 may additionally be configured to: enable the appropriate movement of the drawer 510 between the receiving position $P_R$ and the picking position $P_P$; provide the appropriate height of the drawer 510; form at least a part of a port column above the drawer 510; and/or define an interior of the access station 500 at least partly separated from an exterior of the access station 500. The interior of the access station 500 is preferably configured to accommodate the drawer 510. The drawer 510 may be configured to further separate the interior of the access station 500 from the exterior of the access station 500 when located in the receiving position $P_R$. By physically separating the interior of the access station 500 from the exterior of the access station 500, the risk of injury can be reduced for the user of the access station 500.

Figure 8C:
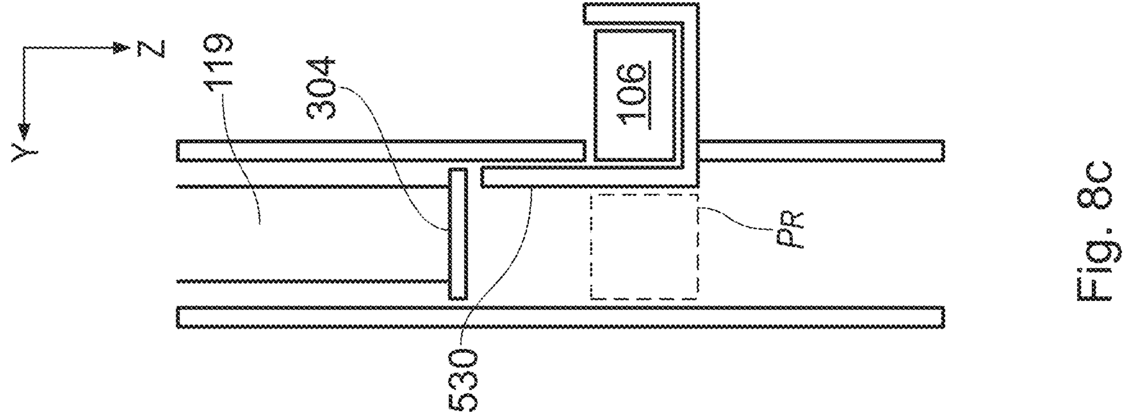
FIG. 8*c* is a horizontal cross-section of the access station of FIG. 8*a* wherein the drawer is located in the picking position, the gripping device is located above the safety zone, and the blocker prevents movement of the gripping device into the safety zone.
Figure 8B:
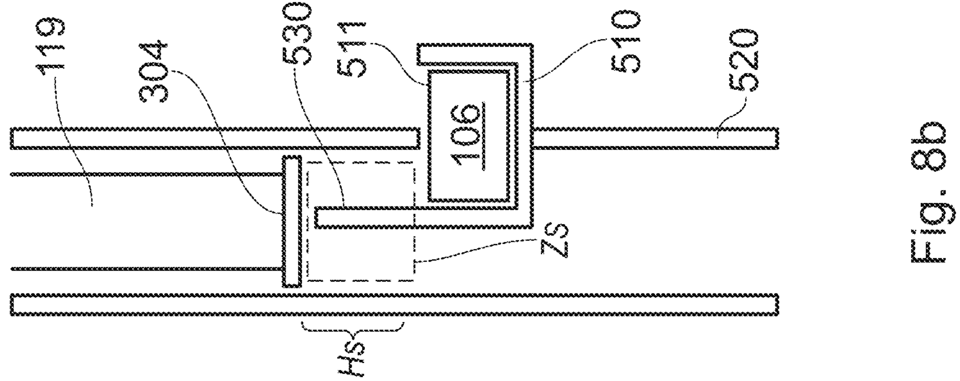
FIG. 8*b* is a horizontal cross-section of the access station of FIG. 8*a* wherein the drawer is located partly outside the receiving position, the gripping device is located above the safety zone, and the blocker prevents movement of the gripping device into the safety zone.
Figure 8A:
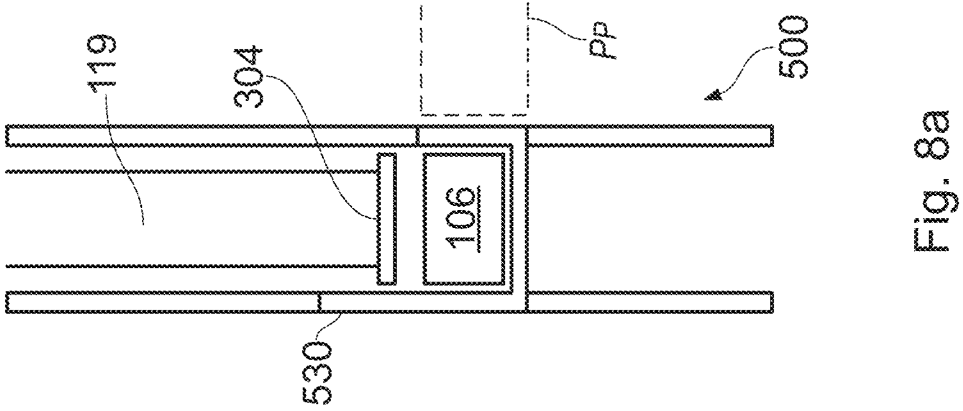
FIG. 8*a* is a horizontal cross-section of an access station wherein a goods holder is positioned in the compartment of the drawer by means of a gripping device, the drawer is located in the receiving position, the gripping device is located inside a safety zone of the access station, and the blocker prevents movement of the drawer.

FIG. 8*a* shows a horizontal cross-section of an access station 500. As illustrated, a goods holder may be placed in a compartment 511 of the drawer 510 by means of a gripping device 304 when the drawer 510 is located in the receiving position $P_R$.

The blocker 530 provides a safety zone $Z_S$ inside the access station 500 and above the receiving position $P_R$.

In FIG. 8*a*, the gripping device 304 is located inside the safety zone $Z_S$. Movement of the drawer 510 towards the picking position $P_P$ (i.e. opening of the drawer 510) will be blocked by the blocker 530. If the drawer 510 is pulled towards the picking position $P_P$, the blocker 530 will meet the gripping device 304. The size of the gripping device 304 leaves little room for sideways movement of the gripping device 304 within the port column 119 or within the frame structure 520 above the receiving position $P_R$. The blocker 530 thus retain the drawer 510 in the receiving position $P_R$ as long as the gripping device 304 is located in the safety zone $Z_S$.

In FIG. 8*a*, the gripping device 304 is used as an example of an object located in the safety zone $Z_S$ that will cause the blocker 530 to block movement of the drawer 510. However, the blocker 530 can block movement of the drawer 510 also when other objects are located in the safety zone $Z_S$. An example of another object may be a goods holder. An object may be located in the safety zone $Z_S$ intentionally (e.g. as part of the operation of the system) or unintentionally (e.g. as a result of a malfunction in the system).

As seen in FIG. 8*a*, the blocker 530 does not interfere with the access to the compartment 511. When the drawer 510 is in the receiving position $P_R$, the blocker 530 does not block the gripping device 304 while the gripping device 304 is placing or retrieving a goods holder in/from the drawer 510. In FIG. 8*a*, the blocker 530 is flush with the frame structure 520. The frame structure 520 may e.g. have a recess for receiving the blocker 530.

FIG. 8*b* shows a horizontal cross-section of the access station 500 of FIG. 8*a*. The gripping device 304 is located above the safety zone $Z_S$. The blocker 530 therefore does not block movement of the drawer 510 between the receiving position $P_R$ and the picking position $P_P$. In FIG. 8*b*, the drawer 510 is located partly outside the receiving position $P_R$ and the blocker 530 is located in the safety zone $Z_S$.

When the blocker is in the safety zone $Z_S$, the blocker 530 will block movement of the gripping device 304 (and other objects) into the safety zone $Z_S$.

The safety zone $Z_S$ has a height, i.e. a safety height $H_S$. The safety height $H_S$ can be set by the horizontal extent of the blocker 530 during the travel of the drawer 510 between the receiving position $P_R$ and the picking position $P_P$. The safety height $H_S$ may extend upwardly from the drawer 510 at least 0.5 meters, preferably at least 0.75 meters, more preferably at least 1.0 meters.

FIG. 8*c* shows a horizontal cross-section of the access station 500 of FIG. 8*a*. The drawer 510 is located in the picking position $P_P$ and the blocker 530 is located in the safety zone $Z_S$. The blocker 530 will thus block movement of the gripping device 304 (and other objects) into the safety zone $Z_S$.

The drawer 510 may be biased towards the receiving position $P_R$.

When the drawer 510 is in the picking position $P_P$, as illustrated in FIG. 8*c*, the goods holder placed in the compartment 511 of the drawer 510 is presented to a user of the access station 500. The user can then access the content of the goods holder. However, the user should preferably not be able to remove the goods holder from the drawer 510. The frame structure 520 and/or the drawer 510 may therefore be configured to prevent retrieval of a goods holder from the compartment 511 when the drawer 510 is in the picking position $P_P$. This can be achieved by making the available opening of the drawer 510 smaller in the picking position $P_P$ than in the receiving position $P_R$, as illustrated in FIG. 8*c* and FIG. 8*a* respectively. The available opening in FIG. 8*c* is smaller than the size of the goods holder (i.e. the area $A_f$ if the goods holder is a storage container 106), such that the goods holder cannot be retrieved from the drawer 510 when the drawer 510 is in the picking position $P_P$.

As illustrated in FIG. 8*c*, the blocker 530 may limit further movement of the drawer 510 beyond the picking position $P_P$ when the blocker 530 comes into engagement with the frame structure 520.

Figures 9A, 9B:
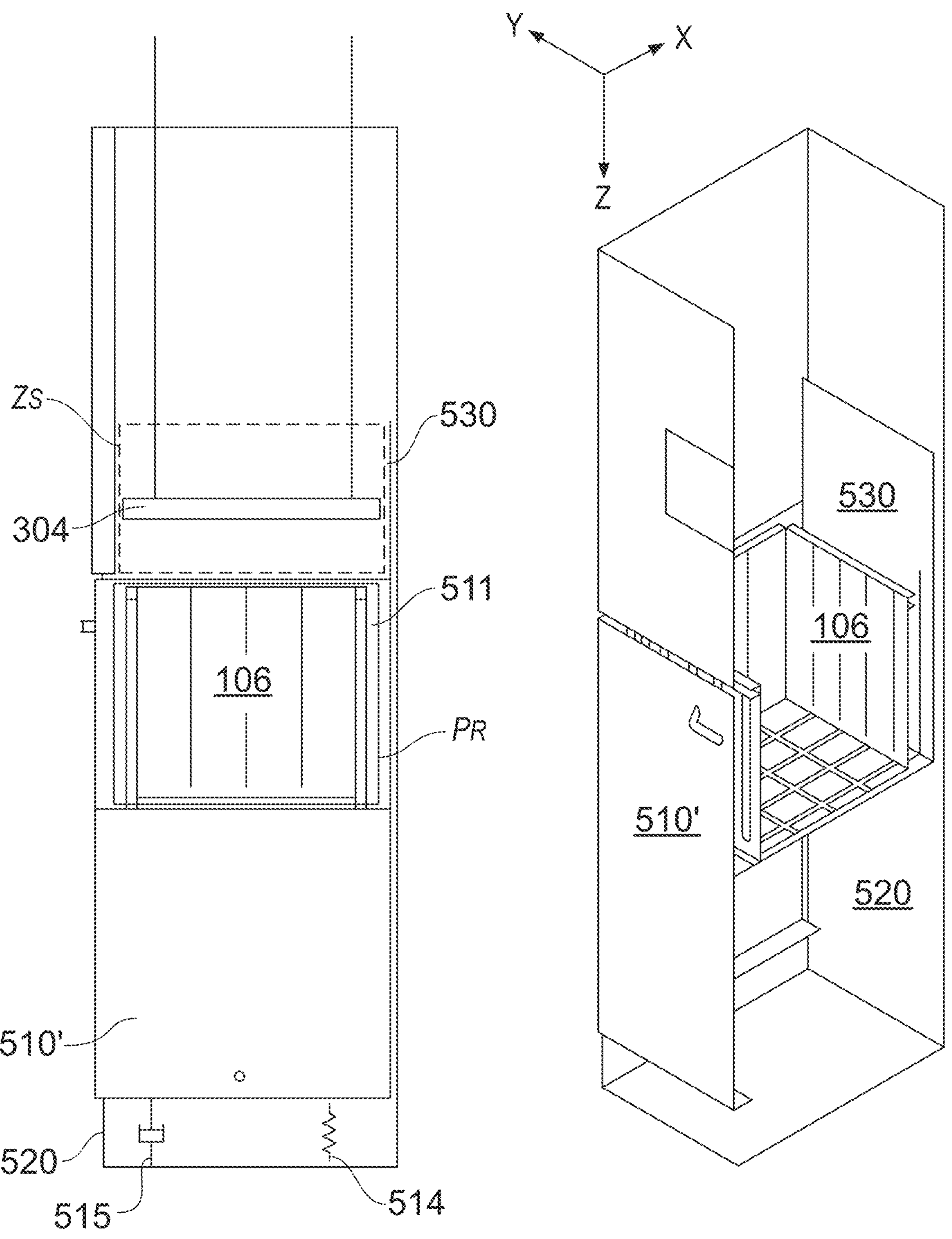
FIG. 9*a* is a horizontal cross-section of an access station with a tilt drawer wherein a goods holder is positioned in the compartment of the tilt drawer by means of a gripping device, the tilt drawer is located in the receiving position, the gripping device is located inside a safety zone of the access station, and the blocker prevents movement of the tilt drawer.
FIG. 9*b* is a perspective view of a horizontal cross-section of the access station of FIG. 9*a* without the gripping device.
Figures 10A, 10B:
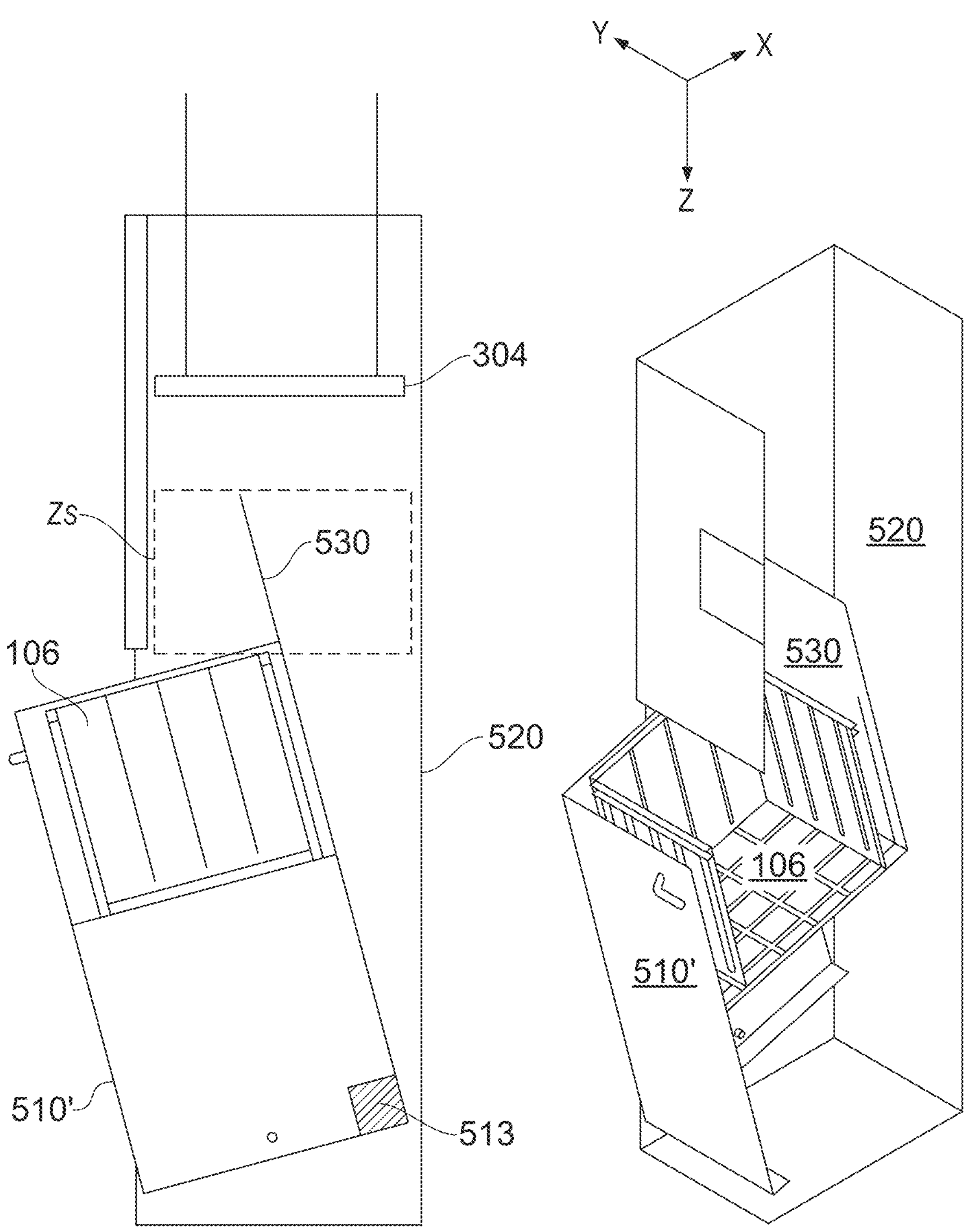
FIG. 10*a* is a horizontal cross-section of the access station of FIG. 9*a* wherein the tilt drawer is located partly outside the receiving position, the gripping device is located above the safety zone, and the blocker prevents movement of the gripping device into the safety zone.
FIG. 10*b* is a perspective view of a horizontal cross-section of the access station of FIG. 10*a* without the gripping device.
Figures 11A, 11B:
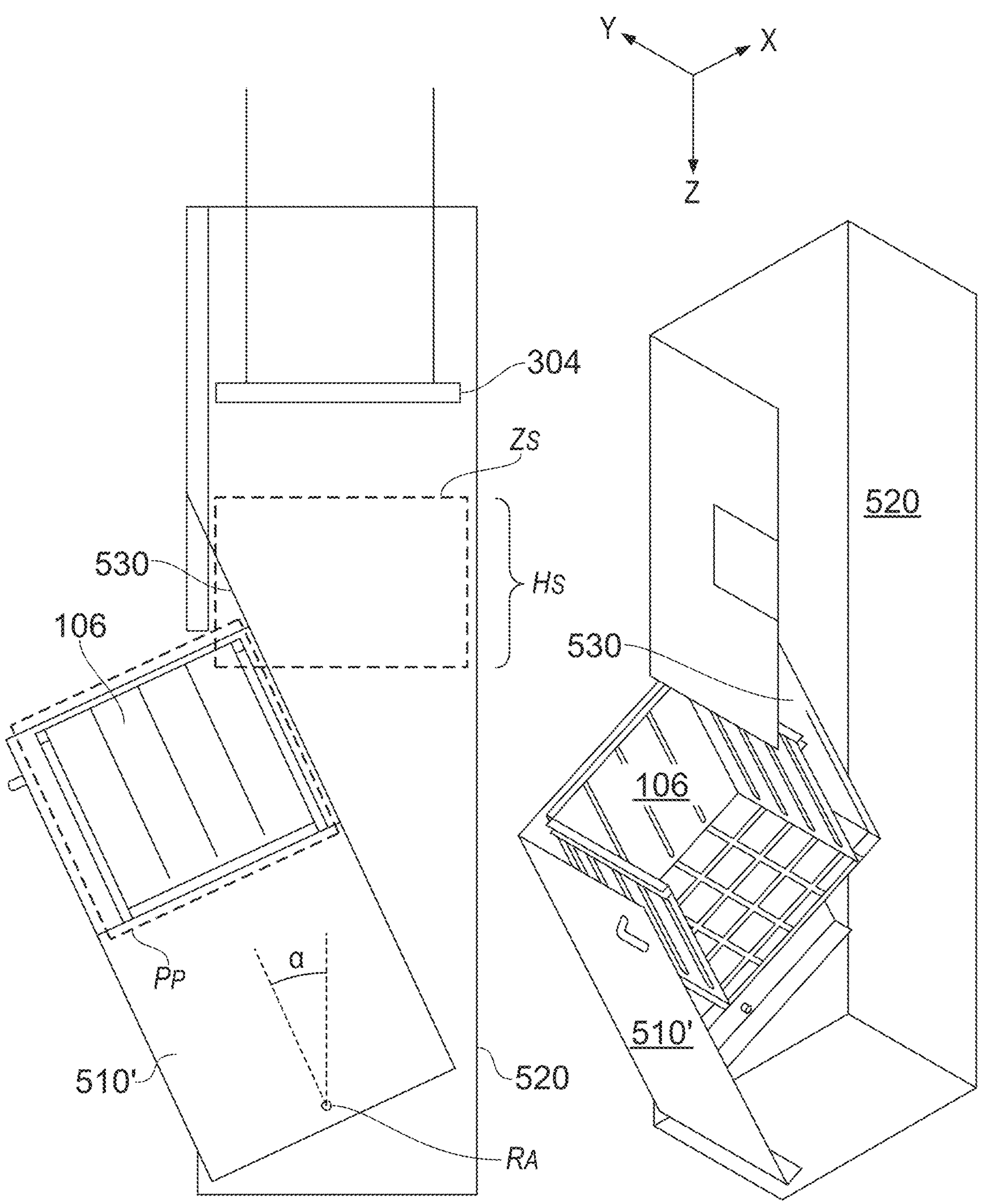
FIG. 11*a* is a horizontal cross-section of the access station of FIG. 9*a* wherein the tilt drawer is located in the picking position, the gripping device is located above the safety zone, and the blocker prevents movement of the gripping device into the safety zone.
FIG. 11*b* is a perspective view of a horizontal cross-section of the access station of FIG. 11*a* without the gripping device.

FIG. 9*a*, FIG. 10*a* and FIG. 11*a* show horizontal cross-sections of an access station 500 wherein the drawer 510 is a tilt drawer 510'. This access station 500 may comprise any one of the features of the access station 500 of FIG. 8*a-c*, except that the tilt drawer 510' illustrated in FIG. 9*a*, FIG. 10*a* and FIG. 11*a* is arranged to tilt between the receiving position $P_R$ and the picking position $P_P$.

FIG. 9*b*, FIG. 10*b* and FIG. 11*b* show perspective views of a horizontal cross-section of the access station of FIG. 9*a*, FIG. 10*a* and FIG. 11*a* respectively, without the gripping device 304.

In FIG. 9*a-b*, a goods holder in the form of a storage container 106 is placed in the compartment 511 of the tilt drawer 510' by means of a gripping device 304. The tilt drawer 510' is located in the receiving position $P_R$ and the gripping device 304 is located in the safety zone $Z_S$ of the access station 500 such that the blocker 530 prevents movement of the tilt drawer 510'.

In FIG. 10*a-b*, the tilt drawer 510' is located partly outside the receiving position $P_R$ and the gripping device 304 is located above the safety zone $Z_S$. The blocker 530 is located in the safety zone $Z_S$ of the access station 500. The blocker 530 thus prevent movement of the gripping device 304 (and other objects) into the safety zone $Z_S$.

In FIG. 11*a-b*, the tilt drawer 510' is located in the picking position $P_P$ and the gripping device 304 is located above the safety zone $Z_S$. The blocker 530 is located in the safety zone $Z_S$ of the access station 500. The blocker 530 thus prevent movement of the gripping device 304 (and other objects) into the safety zone $Z_S$.

As illustrated in FIG. 11*a-b*, the blocker 530 may limit further tilting of the drawer 510 beyond the picking position $P_P$ when the blocker 530 comes into engagement with the frame structure 520. The blocker 530 may thus function as a tilt limiter.

The tilt drawer 510' may be biased towards the receiving position $P_R$ by a clump weight 513, a spring 514, a damper 515 or any combinations thereof.

As illustrated in FIG. 11*a*, the tilt drawer 510' has a tilting angle $\alpha$ between the receiving position $P_R$ and the picking position $P_P$. The tilt drawer 510' may have a horizontal axis of rotation R arranged at a lower end of the tilt drawer 510'.

When the tilt drawer 510' is in the picking position $P_P$, as illustrated in FIG. 11*a*, the goods holder placed in the compartment 511 of the tilt drawer 510' is presented to a user of the access station 500. The user can then access the content of the goods holder. However, the user should preferably not be able to remove the goods holder from the tilt drawer 510'. The frame structure 520 and/or the tilt drawer 510' may therefore be configured to prevent retrieval of a goods holder from the compartment 511 when the tilt drawer 510' is in the picking position $P_P$. This can be achieved by making the available opening of the tilt drawer 510' smaller in the picking position $P_P$ than in the receiving position $P_R$, as illustrated in FIG. 11*a* and FIG. 9*a* respectively. The available opening in FIG. 11*a* is smaller than the size of the goods holder (i.e. the area $A_f$ if the goods holder is a storage container 106), such that the goods holder cannot be retrieved from the tilt drawer 510' when the tilt drawer 510' is in the picking position $P_P$.

The access stations 500 are preferably configured for vertical alignment of the receiving position $P_R$ with a port column 119 of an automated storage and retrieval system. In that way a goods holder can be introduced from the port column 119 to the compartment 511 whilst the drawer 510 is in the receiving position $P_R$.

Furthermore, the blocker 530 can prevent introduction of a goods holder into the compartment 511 from the port column 119 whilst the drawer 510 (or tilt drawer 510') is not in the receiving position $P_R$.

The frame structure 520 may form a part of a port column above the drawer 510, as illustrated e.g. in FIG. 8*a*. The port column formed by the frame structure 520 is then preferable configured for vertical alignment with a port column 119 of an automated storage and retrieval system. The access station 500 can thus be configured to provide a lower section of the port column 119.

The port column formed by the frame structure 520 and the port column 119 of the automated storage and retrieval system preferably have matching horizontal cross-sections. In that way the goods holders and the gripping device 304 configured for movement in the port column 119 of the automated storage and retrieval system will also be configured for movement in the port column formed by the frame structure 520.

FIG. 12*a*, FIG. 12*b* and FIG. 12*c* show horizontal cross-sections of an access station 500 wherein the blocker 530 is indirectly connected to the drawer 510. Apart from that, this access station 500 may comprise any one of the features of the access station 500 of FIG. 8*a-c*.

FIG. 12*a* shows a horizontal cross-section of an access station 500. As illustrated, a goods holder may be placed in a compartment 511 of the drawer 510 by means of a gripping device 304 when the drawer 510 is located in the receiving position $P_R$.

The blocker 530 provides a safety zone $Z_S$ inside the access station 500 and above the receiving position $P_R$.

As illustrated in FIG. 12*a-c*, the blocker 530 may be indirectly connected to the drawer 510 by means of an intermediate component in the form of a connecting device 532. A first end of the connecting device 532 may be connected to the drawer 510, preferably to the rear end of the drawer 510. A second end of the connecting device 532 may be connected to the blocker 530.

As illustrated in FIG. 12*a-c*, the blocker 530 may be pivotably connected to the frame structure 520 and arranged above the receiving position $P_R$. The blocker 530 may then pivot inside the interior of the access station 500. The vertical distance between the receiving position $P_R$ and the pivot point 533 of the blocker 530 may define the safety height $H_S$. The blocker 530 is preferably connected to the frame structure 520 at a distal end of the blocker 530.

The blocker 530 may comprise biasing means for biasing the blocker 530 towards a vertical orientation, i.e. such that a longitudinal direction of the blocker 530 has a vertical orientation. When in the vertical orientation, the distal end of the blocker 530 being connected to the frame structure 520 is preferably the lowest point of the blocker 530, as illustrated in FIG. 12*a*. The connecting device 532 is preferably configured to allow the blocker 530 to have a vertical orientation when the drawer 510 is in the receiving position $P_R$.

When in the vertical orientation, the blocker 530 is preferably flush with the frame structure 520 such that an object is allowed to enter the safety zone $Z_S$, e.g. as seen in FIG. 12*a* wherein the gripping device 304 is located inside the safety zone $Z_S$. The frame structure 520 may e.g. have a recess for receiving the blocker 530. As seen in FIG. 12*a*, the blocker 530 does not interfere with the access to the compartment 511. When the drawer 510 is in the receiving position $P_R$, the blocker 530 does not block the gripping device 304 while the gripping device 304 is placing or retrieving a goods holder in/from the drawer 510.

The second end of the connecting device 532 may be connected to the blocker 530 in several ways in order to make the blocker 530 operational with the drawer 510, such that movement of the drawer 510 cause the blocker 530 to move. Moving the drawer 510 from the receiving position $P_R$ towards the picking position $P_P$ should thus cause the blocker 530 illustrated in FIG. 12*a-c* to pivot.

A blocker 530 pivotally connected to the frame structure 520 if preferably not allowed to pivot the full 180°. The blocker may be restricted in pivoting beyond a predetermined point. The predetermined point may preferably be a point wherein the blocker 530 has a substantially horizontal orientation. With that orientation, the blocker 530 will block a greater horizontal cross-section of the port column. Such orientation of the blocker 530 could be achieved by allowing the blocker 530 to pivot approximately 90°, relative to the vertical orientation. The blocker 530 may however be allowed to pivot more e.g. 135° or less e.g. 45°. If the blocker 530 can pivot more than 0° and less than 180° it may to some extent block a part of the horizontal cross-section of the port column and thus prevent objects entering the safety zone $Z_S$.

As illustrated in FIG. 12*a-c*, the connecting device 532 may be flexible. The flexible connecting device 532 may e.g. be a wire, chain, rope or similar. Alternatively, the connecting device 532 may be rigid. The rigid connecting device 532 may e.g. be a coupler link.

As illustrated in FIG. 12*a-c*, the connecting device 532 may be connected to the blocker 530 in a sliding manner. Alternatively, the connecting device 532 may be connected to the blocker 530 in a fixed manner. When the connecting device 532 is connected to the blocker 530 in a fixed manner, the connecting device 532 is preferably connected to a distal end of the blocker 530 opposite the distal end of the blocker 530 connected to the frame structure 520.

A rigid connecting device 532 is preferably connected to the drawer 510 and the blocker 530 at opposite distal ends of the connecting device 532 in a pivotal manner.

In FIG. 12*a*, movement of the drawer 510 towards the picking position $P_P$ (i.e. opening of the drawer 510) will be blocked by the blocker 530. If the drawer 510 is pulled towards the picking position $P_P$, the blocker 530 will meet the gripping device 304. The size of the gripping device 304 leaves little room for sideways movement of the gripping device 304 within the port column 119 or within the frame structure 520 above the receiving position $P_R$. The blocker 530 thus retain the drawer 510 in the receiving position $P_R$ as long as the gripping device 304 is located in the safety zone $Z_S$.

FIG. 12*b* shows a horizontal cross-section of the access station 500 of FIG. 12*a*. The gripping device 304 is located above the safety zone $Z_S$. The blocker 530 therefore does not block movement of the drawer 510 between the receiving position $P_R$ and the picking position $P_P$. In FIG. 12*b*, the drawer 510 is located partly outside the receiving position $P_R$ and the blocker 530 is located above the safety zone $Z_S$.

When the blocker is above the safety zone $Z_S$, the blocker 530 will block movement of the gripping device 304 (and other objects) into the safety zone $Z_S$.

FIG. 12*c* shows a horizontal cross-section of the access station 500 of FIG. 12*a*. The drawer 510 is located in the picking position $P_P$ and the blocker 530 is located above the safety zone $Z_S$. The blocker 530 will thus block movement of the gripping device 304 (and other objects) into the safety zone $Z_S$.

In FIG. 12*a-c*, the blocker 530 is arranged above the safety zone $Z_S$, however, this blocker 530 may also be arranged in the safety zone $Z_S$.

Figures 13A, 13B, 13C:
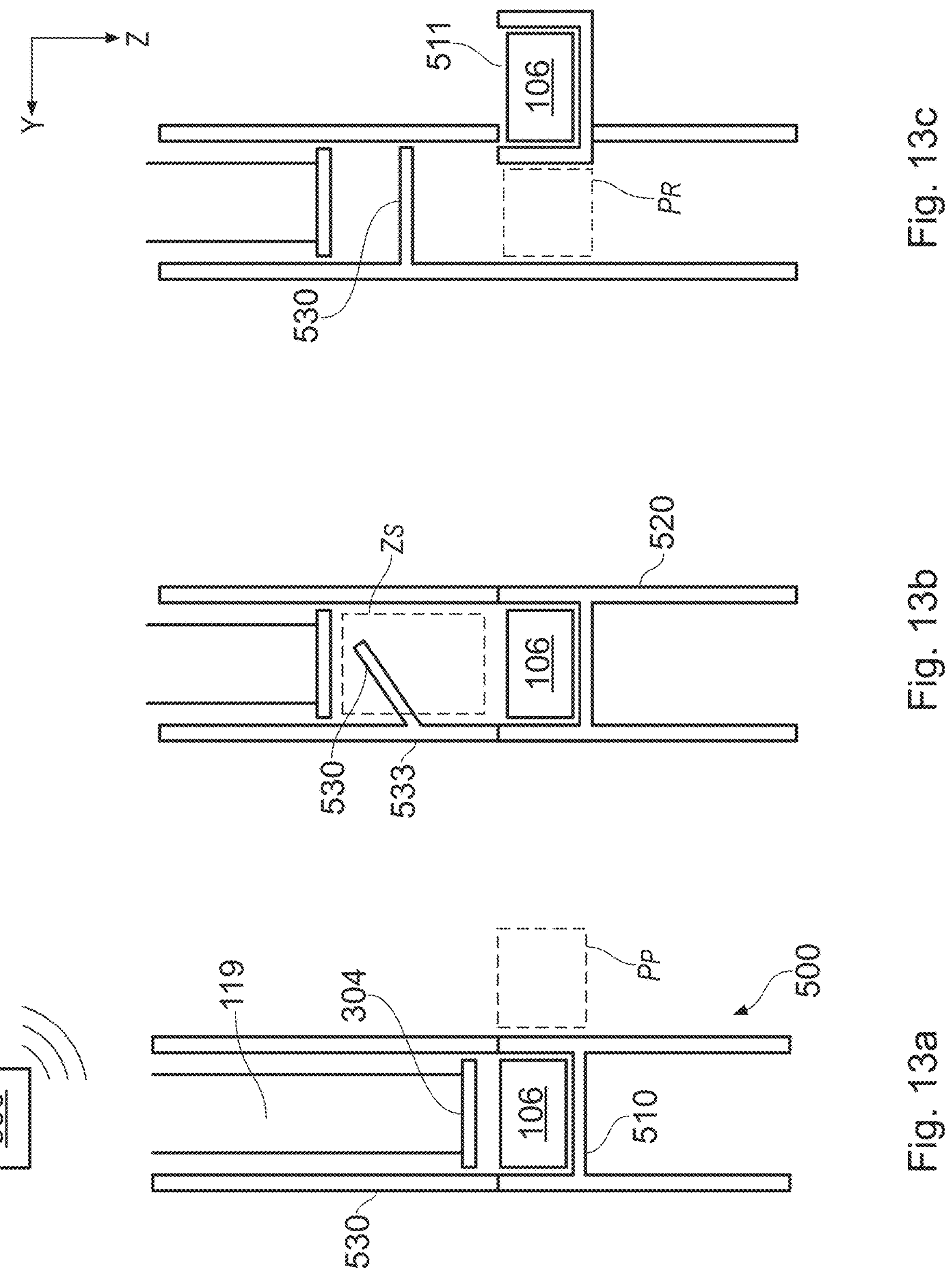
FIG. 13*a* is a horizontal cross-section of an access station wherein a goods holder is positioned in the compartment of the drawer by means of a gripping device, the drawer is located in the receiving position, the gripping device is located inside a safety zone of the access station, the blocker is connected to the frame structure, and a control system operates the blocker and the drawer.
FIG. 13*b* is a horizontal cross-section of the access station of FIG. 13*a* wherein the drawer is located in the receiving position, the gripping device is located above the safety zone, and the blocker is positioned inside the safety zone to prevent movement of the gripping device into the safety zone.
FIG. 13*c* is a horizontal cross-section of the access station of FIG. 13*a* wherein the drawer is located in the picking position, the gripping device is located above the safety zone, and the blocker prevents movement of the gripping device into the safety zone.

FIG. 13*a*, FIG. 13*b* and FIG. 13*c* show horizontal cross-sections of an access station 500 wherein the blocker 530 is not physically connected to the drawer 510. The access station 500 may comprise a sensor (not illustrated) for sensing the presence of an object in the safety zone ZS, an electric motor (not illustrated) for operating the blocker 530 between a position outside the safety zone ZS and a position inside the safety zone ZS, an electric lock (not illustrated) for locking the drawer 510 in the receiving position PR, and a control system 600 for communicating with the sensor, the electric motor and the electric lock. Apart from that, this access station 500 may comprise any one of the features of the access station 500 of FIG. 8*a-c*.

The control system may be configured to lock the drawer in the receiving position when the blocker is positioned outside the safety zone and to unlock the drawer when the blocker is positioned inside the safety zone.

The control system may be configured to retain the blocker in a position inside the safety zone when the drawer is located at least partly outside the receiving position.

The control system may be configured to retain the blocker in a position outside the safety zone when the sensor detects an object in the safety zone.

The sensor may be configured to distinguish the blocker from other objects.

The control system 600 is illustrated as a wireless control system 600. However, cables may alternatively be used.

In FIG. 13*a*, an object in the form of a gripping device 304 is inside the safety zone $Z_S$. The sensor detects the object and transmits a signal to the control system 600. The control system 600 locks the drawer 510 in the receiving position $P_R$ by means of the electric lock. The control system 600 further retains the blocker 530 in the position outside the safety zone $Z_S$. When the gripping device 304 has placed the goods holder in the compartment 511 of the drawer 510, the gripping device 304 can be retrieved to a position above the safety zone $Z_S$.

In FIG. 13*b*, the gripping device 304 is retracted above the safety zone $Z_S$. The sensor does no longer detect an object in the safety zone $Z_S$ and transmits a signal to the control system 600. The control system 600 then releases the blocker 530 from the position outside the safety zone $Z_S$ and moves the blocker 530 inside the safety zone $Z_S$ by means of the electric motor. The sensor detects the blocker 530 inside the safety zone $Z_S$ but is configured to recognize the blocker 530 and thus distinguish it from other objects. When the blocker 530 is inside the safety zone $Z_S$ it will prevent other objects from entering the safety zone $Z_S$. When the blocker 530 is inside the safety zone $Z_S$ the control system 600 will release the drawer 510 from the receiving position $P_R$. A user may then open the drawer 510, i.e. move the drawer 510 from the receiving position $P_R$ towards the picking position $P_P$.

In FIG. 13*c*, the drawer 510 is in the picking position $P_P$, i.e. at least partly outside the receiving position $P_R$. The control system 600 then retains the blocker 530 inside the safety zone $Z_S$ until the drawer 510 is in the receiving position $P_R$.

Once the drawer 510 has returned to the receiving position $P_R$, the control system 600 will release the blocker 530 from the position inside the safety zone $Z_S$ and move the blocker 530 to the position outside the safety zone $Z_S$ by means of the electric motor. The gripping device 304 may then access the safety zone $Z_S$ and retrieve the goods holder from the compartment 511 of the drawer 510.

An automated storage and retrieval system may comprise any one of the above described access stations 500 or any number and combinations of the above described access stations 500. The automated storage and retrieval system may additionally comprise a rail system 108, wherein the rail system comprises a first set of parallel rails 110 arranged in a horizontal plane Pu and extending in a first direction X and a second set of parallel rails 111 arranged in the horizontal plane Pu and extending in a second direction Y which is orthogonal to the first direction X, which first and second sets of rails 110, 111 form a grid in the horizontal plane PHI comprising a plurality of adjacent access openings 112. The automated storage and retrieval system may additionally comprise a storage section comprising a plurality of goods holders arranged in storage columns 105 located beneath the rail system 108, wherein each storage column 105 is located vertically below one of the plurality of access openings 112. The automated storage and retrieval system may additionally comprise at least one port column 119 located beneath the rail system 108 and vertically aligned with a receiving position $P_R$ of the access station 400, the at least one port column 119 being void of goods holders. The automated storage and retrieval system may additionally comprise a container handling vehicle 201; 301; 401 comprising a gripping device 304 for lifting goods holders stored in the columns 105 above the storage section and drive means 201*b*, 201*c*; 301*b*, 301*c*; 401*b*, 401*c* configured to drive the vehicle 301 along the rail system 108 in at least one of the first direction X and the second direction Y.

The above described access stations 500 may be operated as follows:

- retrieving a goods holder stored in a storage section of a storage and retrieval system by means of a container handling vehicle 201; 301; 401 comprising a gripping device 304;
- entering the safety zone $Z_S$ of the access station 500 with the goods holder being held by the gripping device 304; 404, wherein a drawer 510 of the access station 500 has been moved to a receiving position $P_R$, the receiving position $P_R$ being arranged below the safety zone $Z_S$;
- placing the goods holder in a compartment 511 of the drawer 510;
- retracting the gripping device 304; 404 to a position outside the safety zone $Z_S$;
- moving the drawer 510 into a picking position $P_P$ to present the goods holder to the user;
- returning the drawer 510 to the receiving position $P_R$;
- entering the safety zone $Z_S$ with the gripping device 304; 404; and
- retracting the goods holder from the compartment 511 by means of the gripping device 304; 404 to a position outside the safety zone $Z_S$.

In the preceding description, various aspects of the delivery vehicle and the automated storage and retrieval system according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

LIST OF REFERENCE NUMBERS

1 Prior art automated storage and retrieval system
80 Product item
100 Framework structure
102 Upright members of framework structure
104 Storage grid
105 Storage column
106 Storage container
106' Particular position of storage container
107 Stack
108 Rail system
110 Parallel rails in first direction (X)
111 Parallel rail in second direction (Y)
112 Access opening
119 First port column
120 Second port column
201 Prior art container handling vehicle
201*a* Vehicle body of the container handling vehicle 201
201*b* Drive means/wheel arrangement/first set of wheel in the first direction (X)
201*c* Drive means/wheel arrangement/second set of wheels in the second direction (Y)
301 Prior art cantilever container handling vehicle
301*a* Vehicle body of the container handling vehicle 301
301*b* Drive means/first set of wheels in the first direction (X)
301*c* Drive means/second set of wheels in the second direction (Y)
304 Gripping device
401 Prior art container handling vehicle
401*a* Vehicle body of the container handling vehicle 401
401*b* Drive means/first set of wheels in the first direction (X)
401*c* Drive means/second set of wheels in the second direction (Y)
404 Gripping device 404
500 Access station
510 Drawer
510' Tilt drawer
511 Compartment for goods holder
513 Clump weight
514 Spring
515 Damper
520 Frame structure
530 Blocker
532 Connecting device for blocker
533 Pivot point of blocker
600 Control system
X First direction
Y Second direction
Z Third direction
$H_S$ Safety height
$Z_S$ Safety zone
$P_R$ Receiving position
$P_P$ Picking position
Lf Length of storage container
Hf Height of storage container
Af Area of storage container
$R_A$ Rotation axis
α Tilting angle

The invention claimed is:

1. An access station for an automated storage and retrieval system, wherein the access station comprises:
- a frame structure;
- a drawer arranged in the frame structure and comprising a compartment for accommodating a goods holder,
- wherein the drawer is movable between a receiving position for receiving the goods holder from above where the drawer is retracted into the frame structure for preventing a user from accessing the compartment, and a picking position for presenting the goods holder to a user; and
- a blocker operational with the drawer for providing a safety zone above the receiving position,
- wherein the blocker is configured to block movement of the drawer located in the receiving position when an object is located in the safety zone, and
- wherein the blocker is configured to block movement of the object into the safety zone when the drawer is at least partly located outside the receiving position.

2. The access station according to claim 1,
wherein the blocker is configured to be located outside the safety zone when the drawer is located in the receiving position.

3. The access station according to claim 1,
wherein the blocker is configured to be located inside the safety zone when the drawer is located at least partly outside the receiving position.

4. The access station according to claim 1,
wherein the drawer is arranged to slide between the receiving position and the picking position.

5. The access station according to claim 1,
wherein the drawer is a tilt drawer arranged to tilt between the receiving position and the picking position.

6. The access station according to claim 1,
wherein the safety zone has a safety height that extends upwardly from the drawer at least 0.5 meters.

7. The access station according to claim 1,
wherein the access station is configured for vertical alignment of the receiving position with a port column of an automated storage and retrieval system such that a goods holder can be introduced from the port column to the compartment whilst the drawer is in the receiving position, and wherein the blocker prevents introduction of a goods holder into the compartment from the port column whilst the drawer is not in the receiving position.

8. The access station according to claim 1,
wherein the blocker is attached to the drawer as a retro-fitted part.

9. The access station according to claim 1,
wherein the drawer is biased towards the receiving position.

10. The access station according to claim 1,
wherein the frame structure and/or the drawer are configured to prevent retrieval of a goods holder from the compartment when the drawer is in the picking position.

11. The access station according to claim 1,
wherein the blocker is arranged on the drawer and configured to extend upward in a vertical direction above the drawer.

12. The access station according to claim 1,
wherein the blocker is arranged on the frame structure and connected to the drawer by means of a connecting device, wherein movement of the drawer out of the receiving position causes the blocker to be deployed into and block off entry into the safety zone.

13. The access station according to claim 12,
wherein the blocker comprises biasing means for biasing the blocker out of the safety zone to allow an object to enter the safety zone.

14. A method of presenting a goods holder at an access station using an access station according to claim 1,
wherein the method comprises:
retrieving a goods holder stored in a storage section of a storage and retrieval system by means of a container handling vehicle comprising a gripping device;
entering a safety zone with the goods holder being held by the gripping device, wherein a drawer of the access station has been moved to a receiving position, the receiving position being arranged below the safety zone;
placing the goods holder in a compartment of the drawer;
retracting the gripping device to a position outside the safety zone; and
moving the drawer into a picking position to present the goods holder to the user.

15. The method according to claim 14,
wherein the method, after presenting the goods holder to the user, further comprises the steps of:
returning the drawer to the receiving position;
entering the safety zone with the gripping device; and
retracting the goods holder from the compartment by means of the gripping device to a position outside the safety zone.

16. An automated storage and retrieval system comprising:
an access station for an automated storage and retrieval system, wherein the access station comprises:
a frame structure;
a drawer arranged in the frame structure and comprising a compartment for accommodating a goods holder,
wherein the drawer is movable between a receiving position for receiving the goods holder from above where the drawer is retracted into the frame structure for preventing a user from accessing the compartment, and a picking position for presenting the goods holder to a user; and
a blocker operational with the drawer for providing a safety zone above the receiving position,
wherein the blocker is configured to block movement of the drawer located in the receiving position when an object is located in the safety zone, and
wherein the blocker is configured to block movement of the object into the safety zone when the drawer is at least partly located outside the receiving position;
a rail system comprising a first set of parallel rails arranged in a horizontal plane and extending in a first direction and a second set of parallel rails arranged in the horizontal plane and extending in a second direction which is orthogonal to the first direction, which first and second sets of rails form a grid in the horizontal plane comprising a plurality of adjacent access openings;
a storage section comprising a plurality of goods holders arranged in storage columns located beneath the rail system,
wherein each storage column is located vertically below one of the plurality of access openings;
at least one port column located beneath the rail system and vertically aligned with a receiving position of the access station, the at least one port column being void of goods holders; and
a container handling vehicle comprising a gripping device for lifting goods holders stored in the columns above the storage section and drive means configured to drive the vehicle along the rail system in at least one of the first direction and the second direction.

17. The automated storage and retrieval system according to claim 16,
wherein the automated storage and retrieval system comprises:
at least two access stations.

18. The automated storage and retrieval system according to claim 14,
wherein the automated storage and retrieval system comprises:
at least three access stations.

19. The automated storage and retrieval system according to claim 14,
wherein the automated storage and retrieval system comprises:
at least four access stations.

* * * * *